United States Patent [19]
Berghorn et al.

[11] Patent Number: 6,068,802
[45] Date of Patent: May 30, 2000

[54] METHOD FOR MAKING FOAM FILLED DOORS AND APPARATUS THEREFOR

[75] Inventors: David M. Berghorn, Waterford, Mich.; John Martini, Missisauga, Canada

[73] Assignee: The Stanley Works, New Britain, Conn.

[21] Appl. No.: 09/122,356

[22] Filed: Jul. 24, 1998

[51] Int. Cl.[7] .......................... B29C 44/10; B29C 44/12; B29C 44/18; B32B 5/18
[52] U.S. Cl. ..................... 264/46.5; 264/46.6; 156/78
[58] Field of Search .................. 264/46.4, 46.5, 264/46.6; 52/309.11, 784.13; 156/78

[56] References Cited

U.S. PATENT DOCUMENTS

| | | |
|---|---|---|
| 3,402,520 | 9/1968 | Lee et al. ............................ 52/309.11 |
| 3,512,305 | 5/1970 | Multer . | 
| 4,327,535 | 5/1982 | Governale . |
| 4,602,466 | 7/1986 | Larson ................................. 52/309.11 |
| 4,922,674 | 5/1990 | Thorn . |
| 5,239,799 | 8/1993 | Bies et al. . |
| 5,839,252 | 11/1998 | Berghoen et al. ................... 52/784.13 |

Primary Examiner—Michael W. Ball
Assistant Examiner—Barbara Musser

[57] ABSTRACT

A method for the assembly of doors having a pair of skins and a core of synthetic resin forms a first door element including forming a first skin and a peripheral wall to provide an upwardly opening cavity into which a foamable synthetic resin formulation is introduced. A second skin is then assembled over the cavity, and the resultant door assembly is passed through an elongated heating zone while controlling the thickness dimension of the door assembly to expand and cure the resin formulation in the cavity into a cellular resin insulating core and to bond the skins and core. The several steps are conducted seriatim at stations along a conveyor assembly.

24 Claims, 8 Drawing Sheets

METHOD FOR MAKING FOAM FILLED DOORS AND APPARATUS THEREFOR

BACKGROUND OF THE INVENTION

The present invention relates to doors having a pair of skins and an insulating resin core and, more particularly, to the method of making such foam-filled doors.

Doors with metal or plastic skins and insulating foam cores are widely employed at the present time as entry doors because of their insulating characteristics. They are also utilized in interior applications where some sound reducing and heat transfer benefits are sought to be obtained. Doors with metallic skins are also utilized in interior applications where fire resistance is a consideration.

Generally, such foam-filled doors employ not only the skins but also elements forming a peripheral rectangular frame to support the skins. These framing elements comprise stiles and rails, and they may be formed from metal or wood depending upon the characteristics desired. Illustrative of such doors are Multer U.S. Pat. No. 3,512,305 granted May 19, 1970 (metal skins) and Bies et al U.S. Pat. No. 5,239,799 granted Aug. 31, 1993 (synthetic resin skins). In addition, doors in which the skins are formed with opposing flanges which are joined to provide the peripheral frame and a preformed foam core is inserted therebetween are described in Thorn U.S. Pat. No. 4,922,674 granted May 8, 1990.

Heretofore, the prevalent practice has been to assemble the door skins to the peripheral frame and then to inject a foamable synthetic resin composition into the cavity through one or more inlet apertures. This structure is then subjected to heat and pressure in a platen press and the resin expands and cures.

If the door were intended to have a lite or window, the complete door would then be cut to provide the opening for the lite and the lite mounted therein, thus causing the discard of a substantial amount of resin and a secondary operation after forming of the door. To avoid such waste, it has been proposed to form the skins with the lite opening and to provide a dam about the lite opening before the introduction of the resin as described in Governale U.S. Pat. No. 4,327,535 granted May 4, 1982. However, the cost of making and assembling the dam is substantial.

Moreover, the steps of assembling the skins with the frame and inserting the resin into the cavity have generally been manual operations involving substantial labor content, and this has been a significant factor in the cost of such foam-filled doors.

Recently, Applicant's assignee developed a metal skin door employing a continuous metal frame having channels into which flanges on the skins are inserted. This door is the subject of Berghorn et al Application for U.S. application Ser. No. 08/835,143 filed Apr. 4, 1997.

It is an object of the present invention to provide a novel method for manufacturing such foam-filled doors which is conducted in a substantially continuous manner as the components pass through a series of stations on a conveyor system.

It is also an object to provide such a method in which there is close control over the various components as they are being assembled and processed so as to reduce, if not eliminate, manufacturing defects.

Another object is to provide such a method which is relatively economical and requires minimal labor content.

A further object is to provide an installation in which such a method may be practiced efficiently and economically.

SUMMARY OF THE INVENTION

It has now been found that the foregoing and related objects may be readily attained in a method for the assembly of doors having a pair of skins and a core of synthetic resin in which a pair of skins are formed, and then one of the skins is utilized to form a first door element including a first skin and a peripheral wall providing an upwardly opening cavity. A foamable synthetic resin formulation is inserted into the cavity, and a second skin is assembled to the first door element over the cavity to form a door assembly comprising planar face portions provided by the skins and a peripheral wall portion extending therebetween. The door assembly is then passed through an elongated heating zone while controlling the thickness dimension of the door assembly to expand and cure the resin formulation in the cavity into a cellular resin insulating core and to bond the skins and core.

Preferably, the door element is preheated prior to introduction of the resin formulations, and the second skin prior is preheated to assembly with the first door element. The several steps are conducted seriatim at stations along a conveyor assembly.

A preferred embodiment includes an initial step of forming the first and second skins with flanges along edges thereof, and the door element forming step includes assembling on the upper surface of the first skin a rectangular frame comprising a pair of rails and a pair of stiles and providing the peripheral wall. The flanges of the first skin are engaged with the frame, and, in the assembling step, the flanges of the second skin are engaged with the frame. The door element forming step preferably includes providing channels along and adjacent the side margins of at least the stile portions of the frame, and the forming and assembling steps include engaging the flanges in the channels.

In accordance with one embodiment of the process, the frame is metallic, and there is included a step of bending a continuous length of metallic strip into a rectangular frame which is disposed on the upper surface of the first skin. In another embodiment, the door element forming step utilizes wooden elements to provide the stiles and rails.

In making some doors which may require other elements in the cavity, the method includes the step of placing preformed elements in the cavity adjacent the stiles prior to the step of introducing the resin formulation, after which the elements are then embedded in the insulating core. The skin forming step may include providing aligned door lite apertures in the skins, and there is included an additional step of placing a barrier member in the cavity extending about the aperture of the first skin. The step of introducing resin into the cavity is limited to the area between the barrier member and the peripheral wall.

Generally, the passing step places the door assembly between a pair of heated endless belts spaced apart a predetermined distance. The door skins are moved automatically to stations at which the forming, resin introduction and passing steps take place. In such an automatic process, the second skin is inverted prior to the assembling step.

This method is conveniently carried out for doors with metal skins and a metal frame in a manufacturing facility which includes a frame bending station, a conveyor assembly for movement of the door elements, an assembling station for assembling the frame with a first skin to provide an upwardly opening cavity providing the first door element, a resin introducing station for introducing a foamable synthetic resin formulation into the cavity, a second skin assembly station for assembling the second skin on the first door element over the cavity to form the door assembly, and a curing station in which the door assembly is passed through an elongated heating zone while controlling the thickness dimension of the door assembly to expand and cure the resin formulation in the cavity into a cellular resin insulating core and to bond the skins and core.

DETAILED DESCRIPTION OF THE PREFERRED EMBODIMENT

The method of the present invention is adaptable for use with metallic or synthetic resin skins, and with metallic or wooden frames, or with skins with mating flanges which provide a peripheral wall without a separate frame element. It is also adapted for use to produce doors with lites. Illustrative of such doors are those illustrated in FIGS. 1–9.

Figure 1:
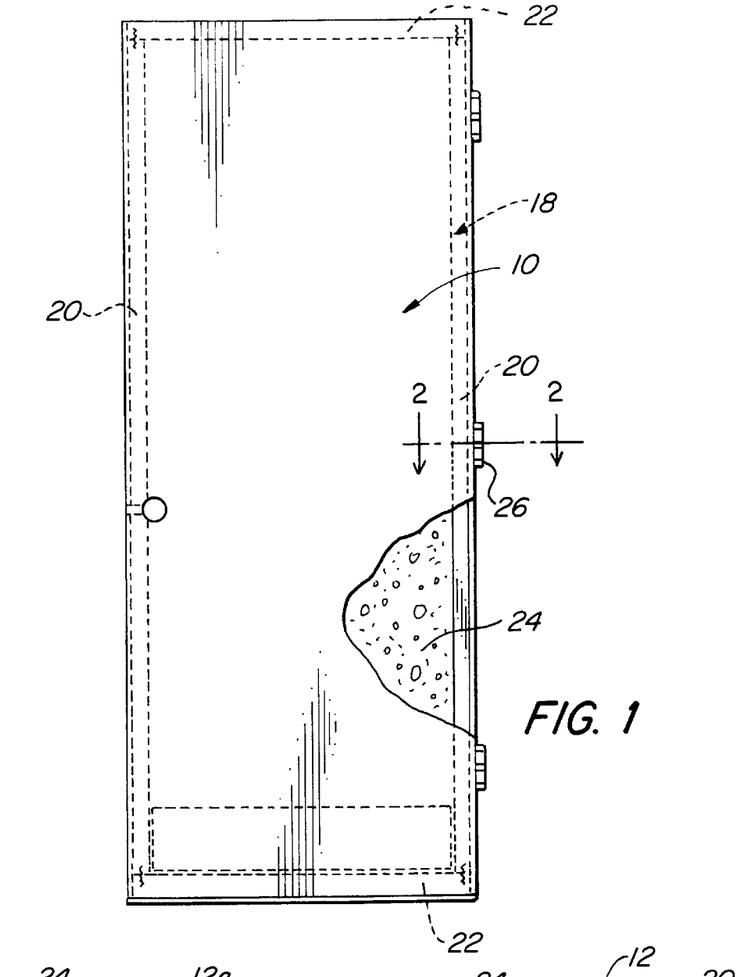
FIG. 1 is a elevational view of a door which may be fabricated in accordance with the present invention showing the peripheral frame in phantom line and with a portion of the skin broken away.
Figure 2:
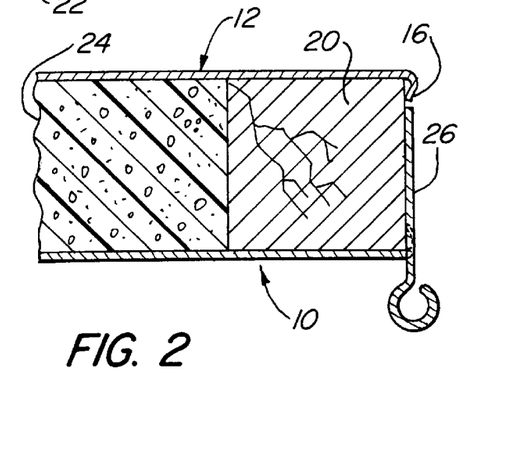
FIG. 2 is a fragmentary cross sectional view thereof along the line 2—2 of FIG. 1 and drawn to an enlarged scale.

Turning first to FIGS. 1 and 2, therein illustrated is a metallic skin door of the type which may be fabricated in accordance with the present invention. As described in detail in the aforementioned Multer U.S. Pat. No. 3,512,405, this door has metallic skins generally designated by the numerals 10, 12 which have opposed flanges 14, 16, and a wooden frame generally designated by the numeral 18 which has stiles 20 and rails 22. A core 24 of synthetic resin fills the cavity defined by the skins 10, 12 and frame 18, and a hinge leaf 26 is shown in FIG. 2 seated in a cutout in the skin 10.

Figure 3:
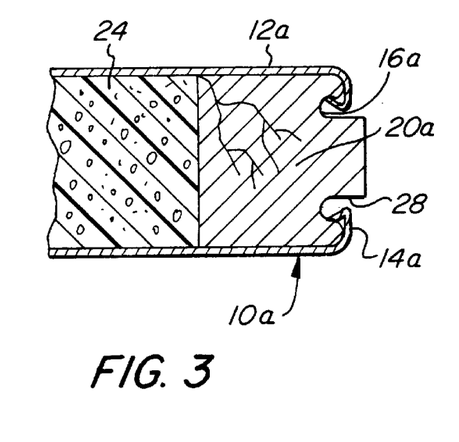
FIG. 3 is a fragmentary cross sectional view of another embodiment in which the stiles are formed with channels in which flanges on the skins are engaged.

FIG. 3 illustrates an alternate and preferred construction in which the stiles 20a are provided with channels 28 extending along the length thereof adjacent the side margins and the flanges 14a, 16a snap into the channels 28 to provide mechanical engagement. The illustrated hinge stile 20a has a protruding center portion in which the hinge may be mortised and which can be trimmed for the door opening.

Figure 4:
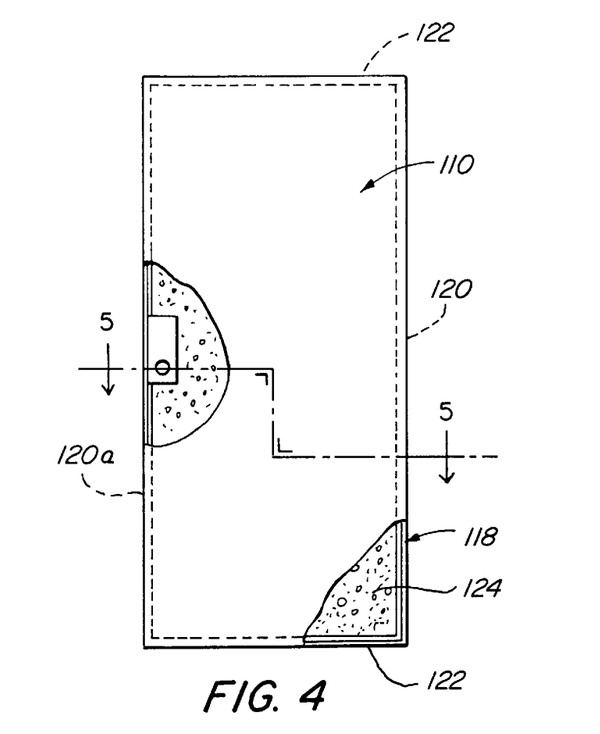
FIG. 4 is a elevational view of another door which can be fabricated in accordance with the present invention with the peripheral frame shown in phantom line and with a portion of the skin broken away.
Figure 5:
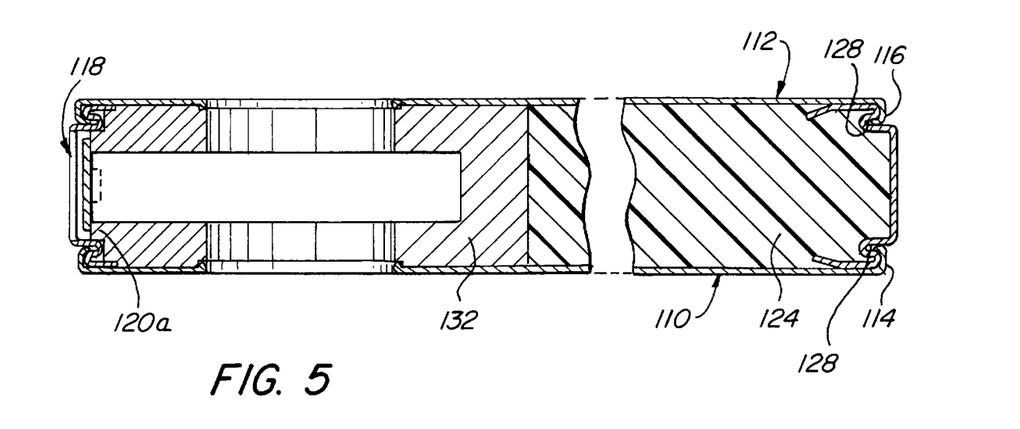
FIG. 5 is a fragmentary cross sectional view along the line 5—5 of FIG. 4 and drawn to an enlarged scale.

Turning next to FIGS. 4 and 5, therein illustrated is a door with metallic skins 110, 112 and a continuous metallic frame 118 providing the stiles and rails 120, 122. Opposed flanges 114, 116 on the skins 110, 112 seat in channels 128 formed adjacent the side margins of the stiles 120. The cavity is filled with a resin core 124, and a latch block 132 is provided on the stile 120a. Such a structure is more fully illustrated and described in the aforementioned Berghorn et al application.

Figures 6, 7:
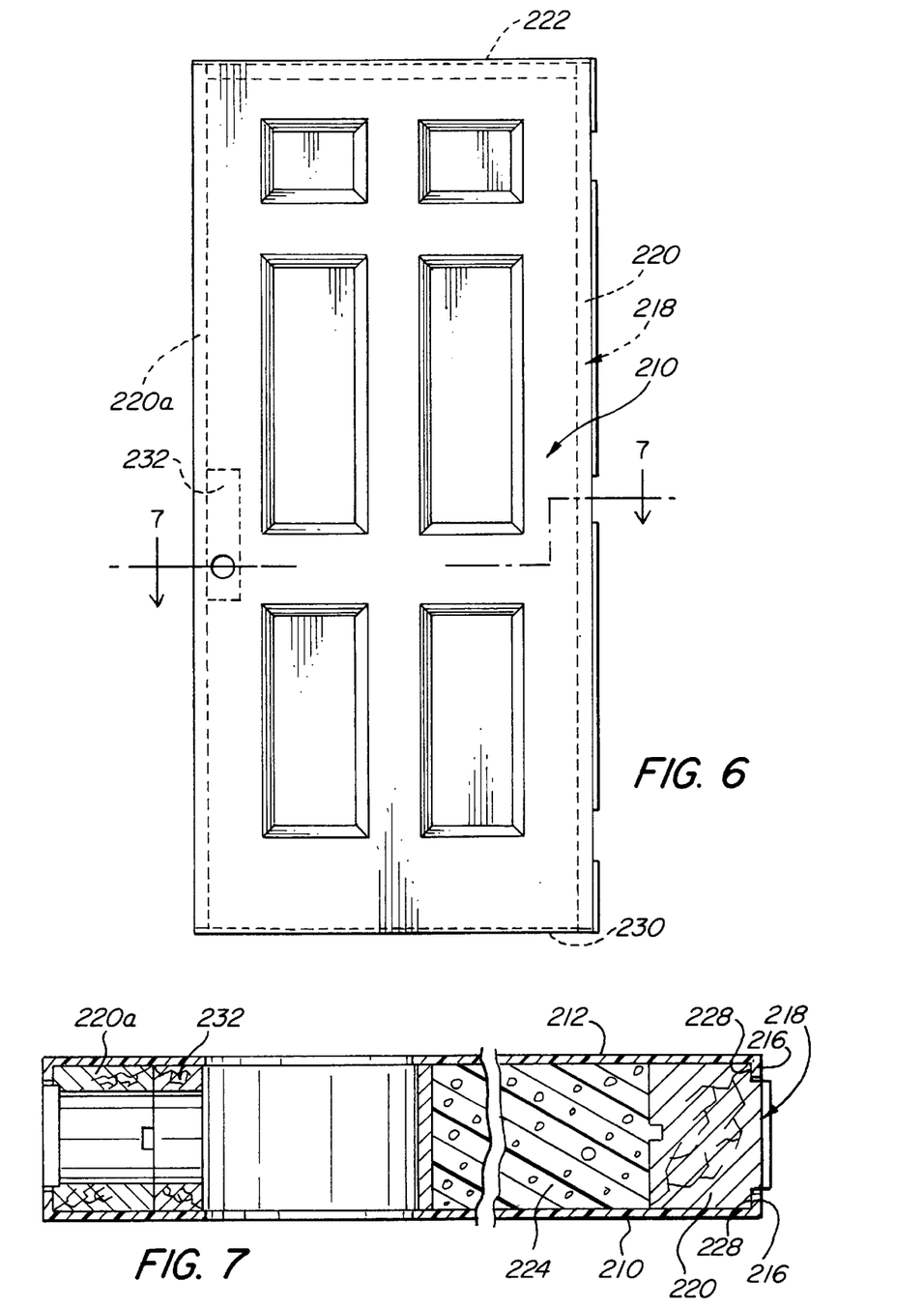
FIG. 6 is an elevational view of another door which may be fabricated in accordance with the present invention and showing the peripheral frame in phantom line.
FIG. 7 is a fragmentary cross sectional view along the line 7—7 of FIG. 6 and drawn to an enlarged scale.

Turning next to FIGS. 6 and 7, therein illustrated is a door with synthetic resin skins 210, 212 with opposed flanges 214, 216, and a frame generally designated by the numeral 218 provided by wooden stiles 220 and wooden top rail 222. The bottom edges of the skins 210, 212 have overlapping flanges to provide a relatively rigid closed bottom wall 230. A core 224 of synthetic resin fills the cavity. The stiles 220 have recesses or channels 228 extending along their side margins in which are seated the flanges 214, 216. A wooden or plastic lock block 232 is preassembled to the latch stile 220a. Such a door is illustrated and described more fully in the aforementioned Bies et al U.S. Pat. No. 5,239,799.

Figure 8:
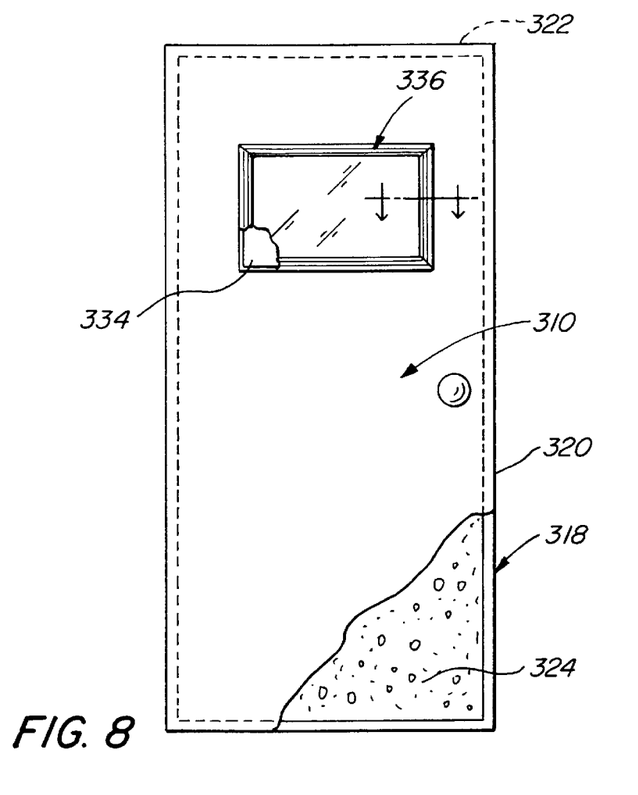
FIG. 8 is an elevational view of a lite-containing door which may be fabricated in accordance with the present invention with a portion of the skin broken away.
Figure 9:
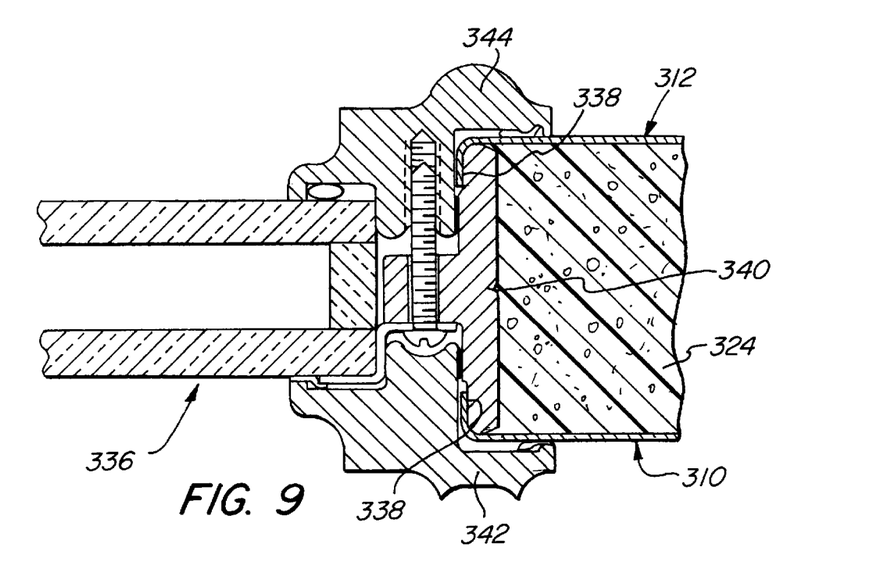
FIG. 9 is a fragmentary cross sectional view along the line 9—9 of FIG. 8 and drawn to an enlarged scale.

Turning next to FIGS. 8 and 9, therein illustrated is a door with metallic skins generally designated by the numerals 310, 312 and having lite apertures 334 therein in which is seated a lite assembly generally designated by the numeral 336. The frame generally designated by the numeral 318 provides stiles and rails 320, 322. The skins 310, 312 have opposed flanges or lips 338 about the apertures 334 formed therein and the lite assembly 336 has a peripheral frame 340 which extends between the skins 310, 312 to provide a dam for resin introduced into the cavity to provide the core 324. The frame 340 also provide a portion upon which the lite mounting elements 342, 344 are mounted. The lite structure is more fully illustrated and described in the copending application of Berghorn et al, Ser. No. 09/208,369, filed Dec. 10, 1998, entitled Composite Door With Lite and Method for Making Same.

Figure 10:
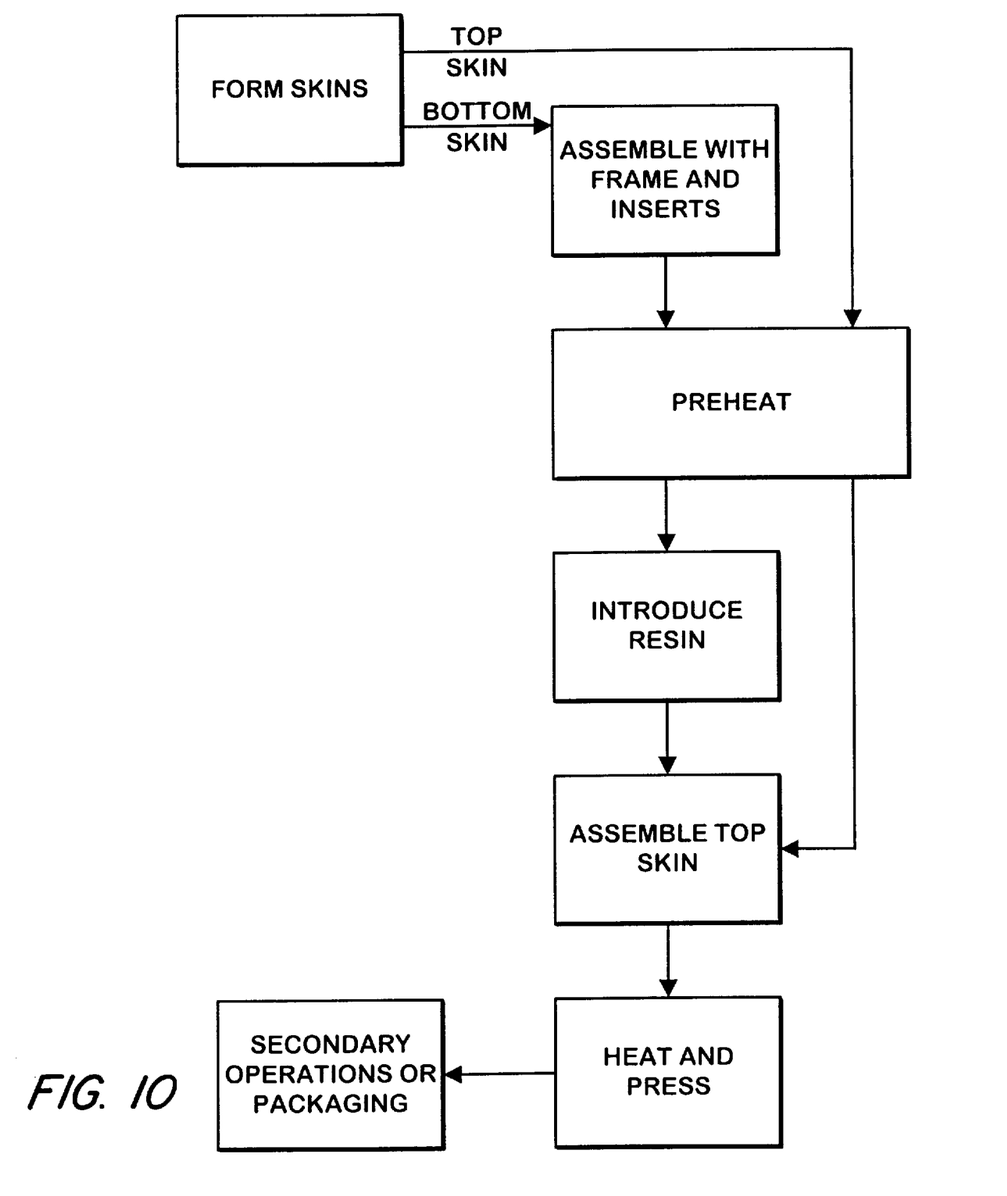
FIG. 10 is a schematic representation of the steps in the method of the present invention.

Turning next to FIG. 10, the method of the present invention involves a series of steps in which the skins are first formed with the desired configuration which will most usually include flanges which are preferred for effecting the assembly with the frame. The skins may be embossed to provide the desired surface appearance. If a door lite is to be provided in the door assembly, cutouts for the door lite are also formed.

In the illustrated method and installation, a separate frame is provided, and one of the skins is assembled with the frame elements disposed thereon so as to provide a door element comprised of the bottom skin and a peripheral wall defining the cavity. Any additional inserts such as a latch block or a lite dam are also assembled therewith at this time.

This door element and the top skin are separately passed into a heating chamber to preheat the door element and the second skin which will provide the top skin. A foamable resin composition is introduced into the cavity defined between the skin and frame elements. After the desired amount of synthetic resin material has been introduced into the cavity, the preheated top skin is then assembled thereover.

The resultant door assembly is immediately passed into an elongated heating and pressing zone in which the thickness dimension of the assembly is maintained as it is moved along a path in which the door is maintained at the desired temperature for a period of time sufficient to ensure complete expansion and curing of the resin formulation. Upon exiting from this heating and pressing zone, the door assembly is now a unitary structure of the desired dimensions.

The door assembly may then be subjected to further processing steps such as the mounting of a door lite, the mortising of recesses to receive hinges, surface decoration and the like.

Following any such secondary operations, the door may be packaged for shipment to vendors and customers.

Figure 11:
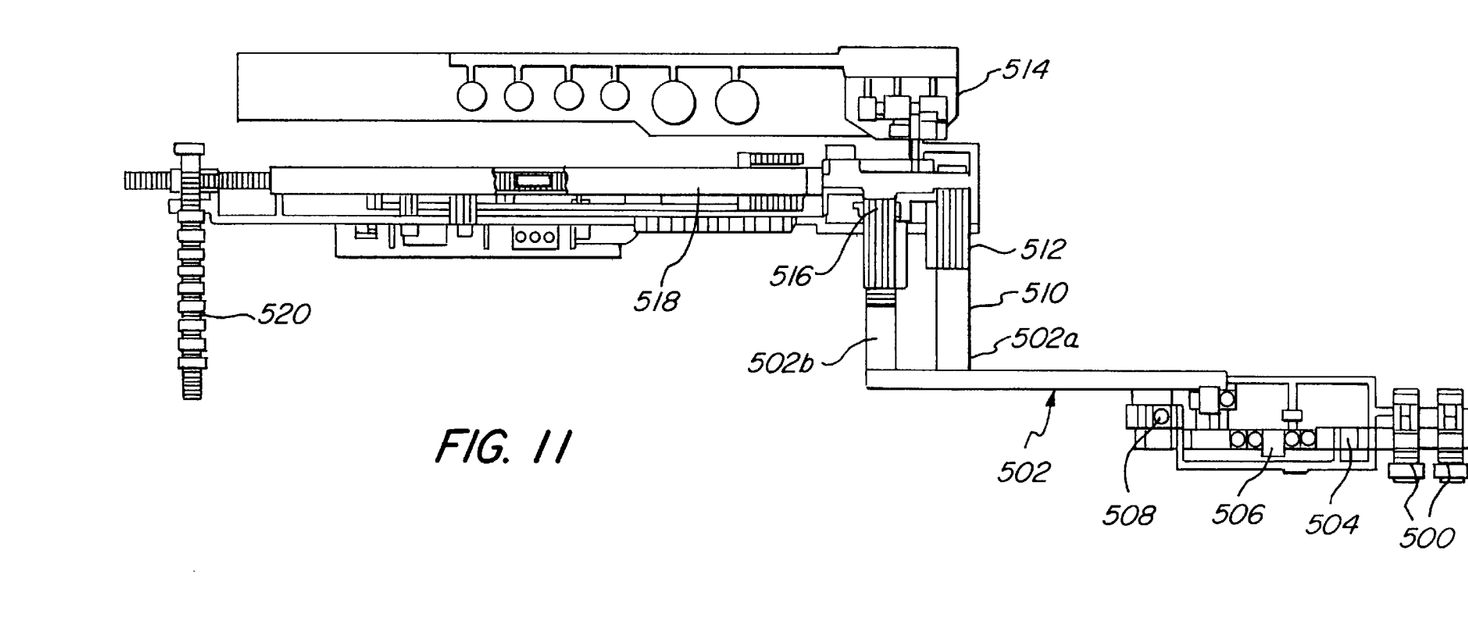
FIG. 11 is a diagrammatic illustration of an installation for practicing the method of the present invention.

FIG. 11 diagrammatically illustrates an installation for the assembly of the doors of FIGS. 1 and 3. Sheet metal skins which have been precut to size are removed by a vacuum transfer apparatus from the stacks 500 and placed upon a conveyor installation generally designated by the numeral 502 and on which they move through a first station 504 in which the corners are notched. At a roll forming station 506 immediately thereafter, flanges are formed along the stile edges thereof. At an end bending station 508 the top and bottom rail edge portions are bent to provide flanges. At a frame assembly station 510, the frame is assembled on the lower skin to provide a cavity.

Subsequently, alternate skins are moved along parallel conveyor sections 502a, 502b. Both conveyor sections pass into a preheater installation 512 wherein the skins are preheated and wherein the synthetic resin formulation from the resin mixing unit 514 is introduced into the cavity. In the preheater installation, a pivoting vacuum transfer unit 516 picks up, inverts and presses the top skin over the cavity and into engagement with the frame.

The door assembly is now introduced into the elongated heating unit 518 wherein it is maintained at the desired temperature and thickness dimension. At the exit end of the unit 518, the doors are moved onto an exit conveyor 520 to packaging or secondary operations.

The frame assembly station can be varied. When a continuous metallic frame such as that illustrated in the aforementioned Berghorn et al application is employed, a continuous strip of metal is formed with channels, punched and bent into a rectangular frame with overlapping ends as it travels along a secondary conveyor. This frame can be transferred onto the lower skin by a suitable transfer apparatus, and is pressed against the margins of lower skin to seat the flanges in its lower channel.

When separate stiles and rails are utilized for the frame, two stiles and a rail can be preassembled into a U-shaped assembly. This is moved onto the lower skin, initially in a somewhat skewed position, from a secondary conveyor by a transfer apparatus which presses it against the flanges of the skin to seat them in the channels or recesses of the stiles. The other rail is inserted between the other ends of the stiles to complete and rigidify the frame.

Obviously, this step of inserting the frame elements can be effected manually if so desired.

Figure 12:
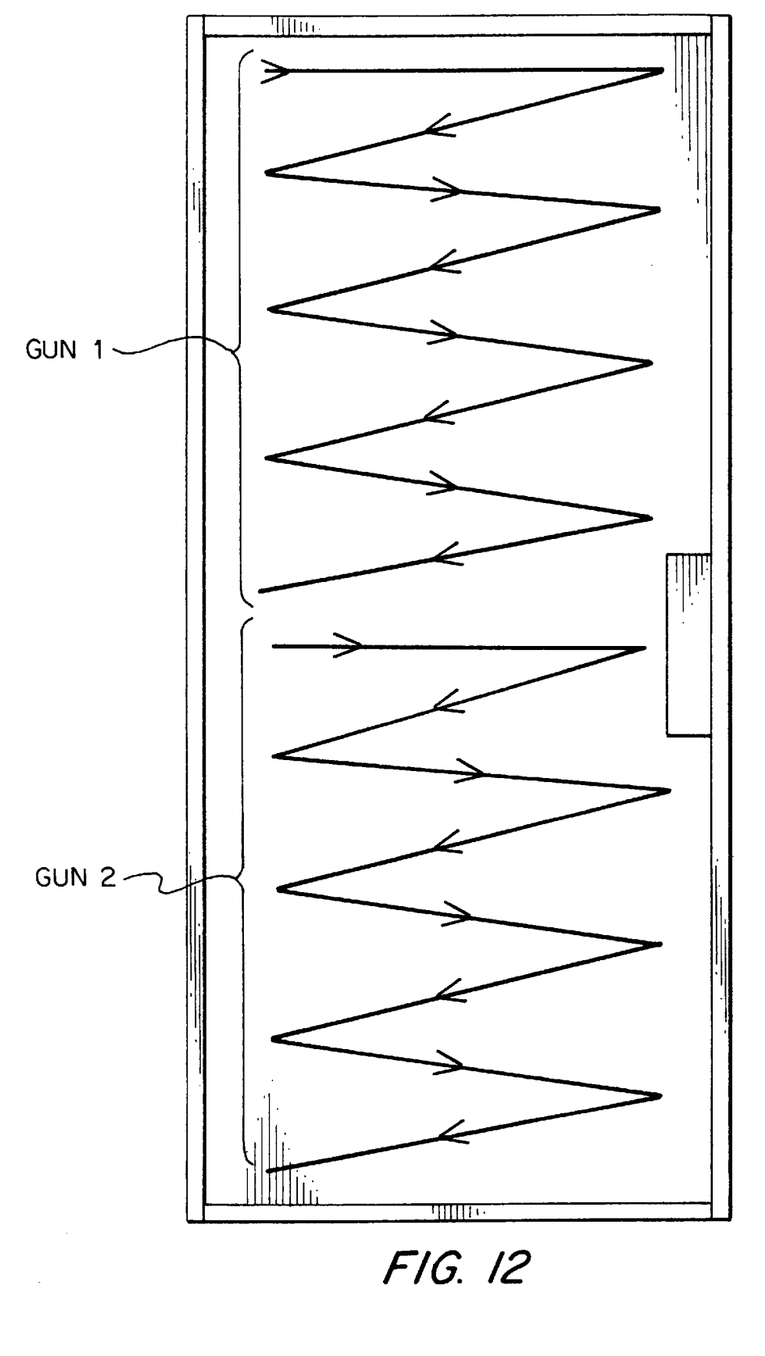
FIG. 12 is a schematic view illustrating the path of movement of the nozzles for introducing the synthetic resin into the door cavity.

Turning next to FIG. 12, therein diagrammatically illustrated are the paths of movement of a pair of nozzles which introduce the resin formulation over the entire cavity. As seen, the two nozzles each traverse half the cavity and can do so as the door is moving along the conveyor.

Figure 13:
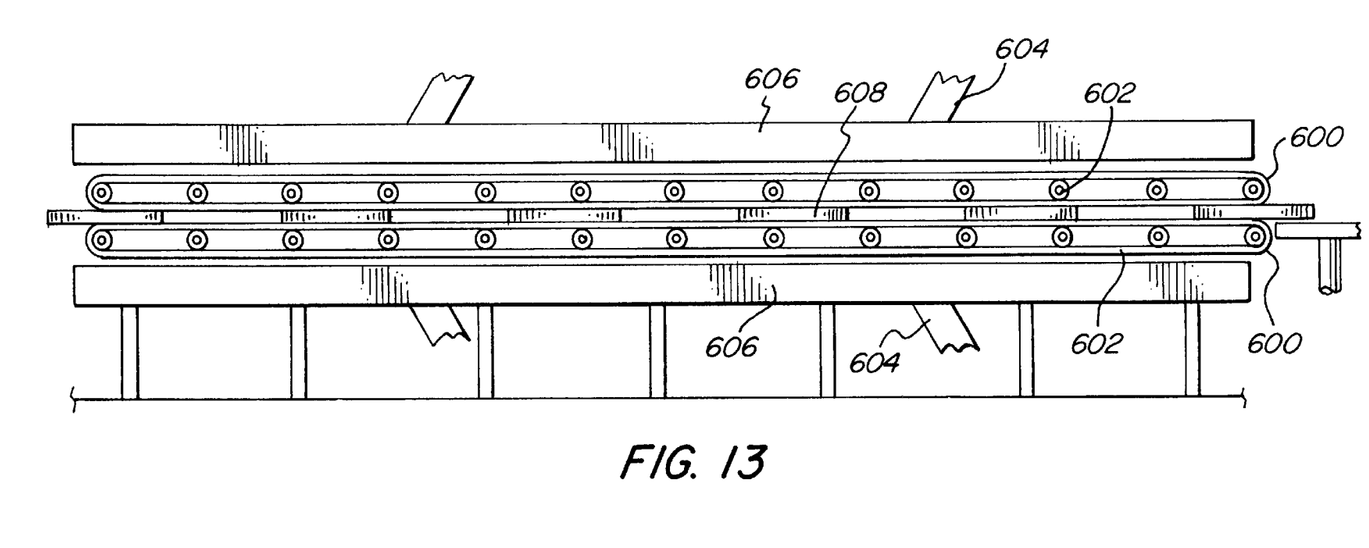
FIG. 13 is a partially schematic view of the elongated heating and pressing unit through which the door assembly is passed to effect full expansion and curing of the synthetic resin between the skins.

Turning lastly to FIG. 13, therein schematically illustrated is the elongated heating and pressing apparatus. It has a pair of endless belts 600 extending about rollers 602 and at least the end rollers are driven. The spacing between the opposed rollers and belts is adjustable to accommodate doors of different thicknesses. The belts 600 are spaced apart the desired thickness for the doors and are perforate so that heated air introduced through ducts 604 and distributed by plenum chambers 606 will flow therethrough to heat both the belts 600 and the doors 608 therebetween.

In the method of the present invention, the door skins and assemblies are moved through the installation generally continuously with short stops at various stations for the operations to take place thereat. Labor and handling are thereby reduced to a minimum. By use of multiple nozzles to introduce the foam into the open cavity, good, relatively uniform distribution of the material throughout the cavity can be obtained. The elongated heating and pressing unit provides a relatively long period for controlled expansion and curing of the resin to take place.

In making doors with synthetic resin skins, the interior surfaces of the skins may be molded with stops to position and retain the frame elements in cooperation with the flanges along the edges. In making doors with lites, lips formed about the openings will generally position the peripheral frame. If a lite is included, the nozzle paths for injecting the resin are programmed to avoid the lite opening.

Metallic skins and metallic or wooden frames can be prepainted because the automatic operations performed thereon may utilize equipment which will not mar the finish.

Although various resin formulations may be employed, polyurethanes are preferred because of the good insulating characteristics, long life and relatively low cost water-base systems are preferred to avoid the necessity for capturing and treating organic solvent vapors. A desirable density for the foam core is about 1.7–2.2 pounds per cubic foot.

By preheating the skins to a temperature of about 110–120° F., the foaming of the resin can be accelerated to reduce process time which would otherwise be required to bring the skins and frame to temperature.

Illustrative of a suitable procedure for a door of 6 feet 8 inches length and 3 feet width and a thickness of 1¾ inches using metal skins of about 0.016–0.032 inch thickness and a wood frame is the following:

About 5.25 pounds of a polyurethane reaction mixture is heated to 220° C. The resin formulation is admixed with 9 percent by volume cyclopentane blowing agent, and the mixture is dispensed by a pair of nozzles into the door cavity in about 6 seconds. The skins and frame have been preheated to about 120° F. The top skin is immediately placed thereover, and the door assembly is introduced into the heating and pressing unit wherein the spacing between the belts is held at 1¾ inches. The door assembly passes along the 45 meter length of the unit in a period of 4 minutes (approximates 32 feet per minute) while it is maintained at a temperature of about 110–120° F. by heated air flowing thereabout.

Upon exiting, the door has the desired thickness dimension without any bowing of the skins and the resin core is fully cured and bonds the skins and frame into a rugged door assembly.

Thus, it can be seen from the foregoing detailed description and attached drawings that the method of the present invention reduces labor, time and waste in the manufacture of foam filled doors using metallic and synthetic resin skins. Because the various operations are automated, manufacturing deviations and defects can be substantially eliminated. The foam core is relative uniform and the resultant door is free from bowing.

Having thus described the invention, what is claimed is:

1. In a method for the assembly of doors having a pair of skins and a core of synthetic resin, the steps comprising:
   (a) forming a pair of skins;
   (b) forming a first door element including a first skin and a peripheral wall providing an upwardly opening cavity;
   (c) introducing foamable synthetic resin formulation into said cavity at a multiplicity of locations through a multiplicity of nozzles, said locations and the amount of resin formulation being introduced at said locations being variable by computer means;
   (d) thereafter assembling a second skin to said first door element over said cavity to form a door assembly comprising planar face portions provided by said skins and a peripheral wall portion extending therebetween; and
   (e) passing said door assembly through an elongated heating zone while controlling the thickness dimension of said door assembly to expand and cure the resin formulation in said cavity into a cellular resin insulating core and to bond said skins and core.

2. The method of assembling doors in accordance with claim 1 wherein there are included the steps of preheating said door element prior to introduction of said resin formulation and preheating said second skin prior to assembly on said first door element.

3. The method of assembling doors in accordance with claim 1 wherein said steps are conducted seriatim at stations along a conveyor assembly.

4. The method of assembling doors in accordance with claim 3 wherein there is included an initial step of forming said first and second skins with flanges along edges thereof.

5. The method of assembling doors in accordance with claim 4 wherein said door element forming step includes assembling to a surface of said first skin a rectangular frame comprising a pair of rails and a pair of stiles and providing said peripheral wall.

6. The method of assembling doors in accordance with claim 5 wherein said door element forming step engages said flanges of said first skin with said frame and wherein said assembling step engages said flanges of said second skin with said frame.

7. The method of assembling doors in accordance with claim 5 wherein said door element forming step includes providing channels along and adjacent the side margins of at least said stile portions of said frame, and wherein said forming and assembling steps include engaging said flanges in said channels.

8. The method of assembling doors in accordance with claim 5 wherein said frame is metallic.

9. The method of assembling doors in accordance with claim 8 wherein said there is included a step of bending a continuous length of metallic strip into a rectangular frame which is disposed on the upper surface of said first skin.

10. The method of assembling doors in accordance with claim 5 wherein said door element forming step utilizes wooden elements to provide said stiles and rails.

11. The method of assembling doors in accordance with claim 7 wherein said assembling step snaps flanges of said second skin into said channels.

12. The method of assembling doors in accordance with claim 1 wherein there is included the step of placing preformed elements in said cavity adjacent said stiles prior to said step of introducing said resin formulation, and wherein said elements are embedded in said insulating core.

13. The method of assembling doors in accordance with claim 1 wherein said skin forming step includes providing aligned door lite apertures in said skins, wherein there is included an additional step of placing a barrier member in said cavity extending about said aperture of said first skin, and wherein said step of introducing resin into said cavity is limited to the area between said barrier member and said peripheral wall.

14. The method of assembling doors in accordance with claim 1 wherein said passing step includes placing said door assembly between a pair of heated endless belts spaced apart a predetermined distance.

15. The method of assembling doors in accordance with claim 1 wherein there is included the step(s) of moving said door skin automatically to stations at which said forming, resin introduction and passing steps take place.

16. The method of assembling doors in accordance with claim 4 wherein there is included the step of inverting said second skin prior to said assembling step.

17. In a method for the assembly of doors having a pair of metallic skins and a core of synthetic resin, the steps comprising:
   (a) forming metallic skins;
   (b) bending a continuous length of metallic strip into a rectangular frame comprised of a pair of stiles and a pair of rails;
   (c) assembling said frame to a first metallic skin to provide an upwardly opening cavity and form a first door element;
   (d) preheating first said door element;
   (e) introducing foamable synthetic resin formulation into said cavity at a multiplicity of locations through a multiplicity of nozzles, said locations and the amount of resin formulation being introduced at said locations being variable by computer means;
   (f) preheating a second metallic skin;
   (g) thereafter assembling said second skin to said first door element over said cavity to form a door assembly comprising planar face portions provided by said skins and stile and rail portions extending therebetween about the periphery thereof; and
   (h) passing said door assembly through an elongated heating zone while controlling the thickness dimension of said door assembly to expand and cure the resin formulation in said cavity into a cellular resin insulating core and to bond said skins and core.

18. The method of assembling doors in accordance with claim 17 wherein said strip has channels extending along and adjacent its side margins, wherein said skins have flanges formed along at least two opposite sides, and wherein said forming and assembling steps include engaging said flanges in said channels.

19. The method of assembling doors in accordance with claim 18 wherein said forming and assembling steps snap flanges of said skins into said channels.

20. The method of assembling doors in accordance with claim 1 wherein said steps are conducted seriatim at stations along a conveyor assembly, and wherein there is included the step of moving said skins and frame automatically to stations at which said forming, resin introduction and passing steps take place.

21. In a method for the assembly of doors having a pair of skins and a core of synthetic resin, the steps comprising:
   (a) forming a pair of skins;
   (b) assembling a pair of wooden rails and a pair of wooden stiles into a rectangular frame on a surface of a first skin to provide an upwardly opening cavity and form a first door element;

(c) preheating said first door element;

(d) introducing foamable synthetic resin formulation into said cavity at a multiplicity of locations through a multiplicity of nozzles, said locations and the amount of resin formulation being introduced at said locations being variable by computer means;

(e) preheating a second skin;

(f) thereafter assembling a second skin to said first door element over said cavity to form a door assembly comprising planar face portions provided by said skins and stile and rail portions extending therebetween about the periphery thereof; and (g) passing said door assembly through an elongated heating zone while controlling the thickness dimension of said door assembly to expand and cure the resin formulation in said cavity into a cellular resin insulating core and to bond said skins and core.

22. The method of assembling doors in accordance with claim 21 wherein at least said stiles are formed with channels extending along and adjacent their side margins, said skins having flanges formed along at least two opposite sides, and wherein said forming and assembling steps include engaging said flanges in said channels.

23. The method of assembling doors in accordance with claim 22 wherein said assembling step snaps flanges of said second skin to said channels.

24. The method of assembling doors in accordance with claim 23 wherein said steps are conducted seriatim at stations along a conveyor assembly.

* * * * *